May 20, 1958  J. SCHEMINGER, JR  2,835,403
INSERT FOR MAKING RECEPTACLE NON-REFILLABLE
Filed Jan. 26, 1955

INVENTOR.
John Scheminger Jr.
BY Elliot A. Salter

United States Patent Office 2,835,403
Patented May 20, 1958

2,835,403

INSERT FOR MAKING RECEPTACLE NON-REFILLABLE

John Scheminger, Jr., Providence, R. I.

Application January 26, 1955, Serial No. 484,261

1 Claim. (Cl. 215—22)

This invention pertains generally to valves and more specifically to an insert for making a receptacle non-refillable.

A primary object of this invention is the provision of means which when inserted into the neck of a receptacle will render said receptacle incapable of being refilled but which at the same time will not restrict the emptying of the receptacle.

Another object of this invention is the provision of non-refillable means particularly adapted for use with liquids or finely granulated powdered substances.

Another object is the provision of non-refillable means which are disposable with the receptacle after the contents have been emptied therefrom.

A further object is the provision of non-refillable means for a receptacle which are effective from horizontal to upright positioning of the receptacle.

Still a further object is the provision of non-refillable means which are fool-proof against probing instruments and the like.

Another object is the provision of non-refillable means for a receptacle which means are adjustable to vary the rate of flow out of the receptacle.

A further object is the provision of an insert for making a receptacle non-refillable which is durable of construction yet economically feasible to manufacture and which is simple but effective in operation.

Other objects, features and advantages of the invention will become apparent as the description thereof proceeds when considered in connection with the accompanying illustrative drawings.

In the drawings which illustrate the best mode presently contemplated by me for carrying out my invention:

For purposes of illustration, my invention is shown and will be described in connection with a bottle. It will be understood, however, that my non-refillable insert is capable of adaptation by any receptacle or container and is equally effective for use with liquids or finely granulated substances.

Figure 1:
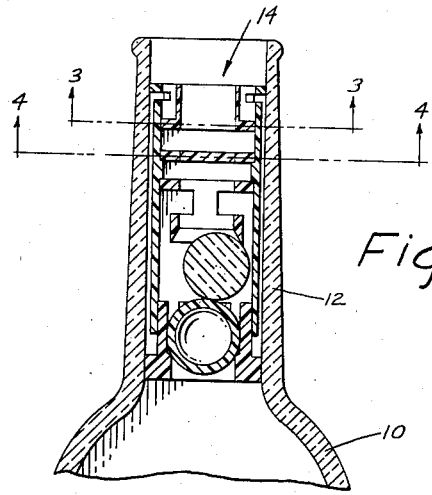
Fig. 1 is a sectional view showing a bottle embodying my invention in upright position.

Referring now to the drawings, and more particularly to Fig. 1 thereof, a bottle 10, having a neck 12 is shown in upright position wherein my insert, designated generally at 14, is in closed or non-refillable position.

Figure 3:
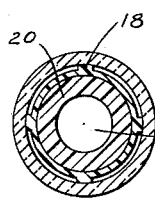
Fig. 3 is a sectional view taken along line 3—3 of Fig. 1.
Figure 4:
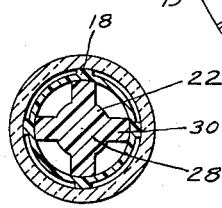
Fig. 4 is a sectional view taken along line 4—4 of Fig. 1.
Figure 8:
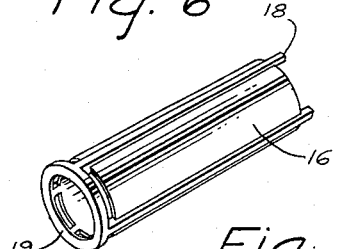
Fig. 8 is a perspective view of the cylindrical shell which forms a part of my invention.

Insert 14 (note Fig. 5), preferably constructed of molded plastic, comprises a cylindrical shell 16, the outer surface of which has a plurality, preferably four, of longitudinally extending ribs 18, see Fig. 8, for reasons which will hereinafter be made apparent. The longitudinal ribs 18 are somewhat longer than the shell 16 and project outwardly therefrom at each end thereof. One end of the ribs 18 carry a circular flange 19. Fixedly secured within the shell 16 by any desired means are disc-like baffles 20 and 22 and seat member 24. Baffle 20 (Fig. 3) is of circular, ring-like configuration and has an aperture 26 centrally disposed therein, and a peripheral wall 27 surrounding said aperture and extending outwardly therefrom to provide a pouring spout. Baffle 22 (Fig. 4) has a circular center portion 28 of substantially the same diameter as aperture 26 or preferably slightly larger and further has carried by said center portion four outwardly extending arms 30. Thus, it will be seen that the baffles 20 and 22 cooperate to block the shell 16 against the entrance of any elongated device such as a rod or a wire while at the same time allowing liquids and the like to pass therethrough.

Figure 6:
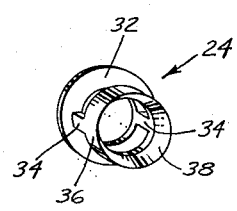
Fig. 6 is a perspective view of the seat member utilized in my invention.

The seating member 24 (Fig. 6) comprises a ring-like backing disc 32 having extending therefrom a pair of diametrically opposed legs 34 which in turn carry a circular receiver 36. As will be evident, from Fig. 5, receiver 36 is hollow, its inner diameter being substantially the same as that of the backing disc 32. The inner peripheral edge of receiver 36 is chamfered as at 38 for reasons which will hereinafter be explained.

Cyindrical shell 16 may be provided with an inner peripheral shoulder 40 which serves both as a support and as positioning means for seating member 24 and baffle 22.

Figure 2:
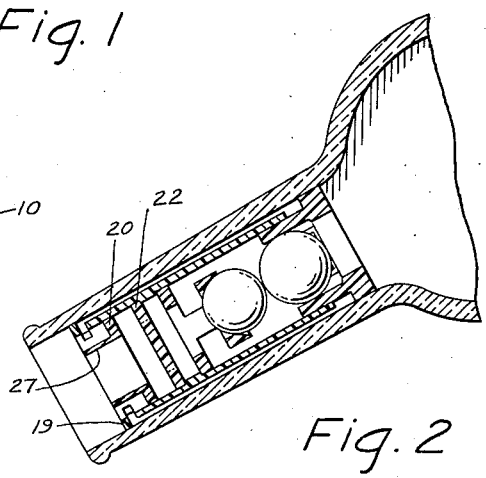
Fig. 2 is a view, partly in section, showing a bottle embodying my invention in downwardly tilted position.
Figure 5:
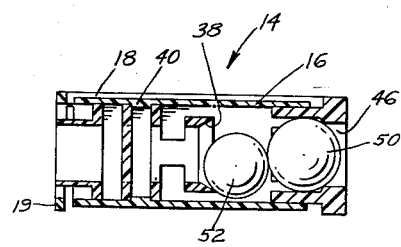
Fig. 5 is a view partly in section, showing my novel insert in horizontal disposition.
Figure 7:
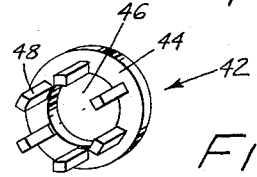
Fig. 7 is a perspective view of the cage element utilized therein.

Tightly pressed into the end of shell 16 facing the receiver 36 is a cage element 42 (Fig. 7), which comprises a circular base 44 of substantially the same diameter as the outer diameter of shell 16, note Figs. 1, 2 or 5. Base 44 has an aperture 46 therein and further has a plurality of inwardly extending legs 48 which are tightly received within the shell 16. The circular enclosure formed by the legs 48 is somewhat larger than the diameter of aperture 46.

Balls 50 and 52, carried within the enclosure defined by receiver 36 and cage 42 complete my assembly. The ball 50 is preferably of hollow plastic and is of sufficient diameter to block the aperture 46 but at the same time is freely rollable within the legs 48 of cage 42. Ball 52 is somewhat heavier than the ball 50 and may be a glass marble or the like. The diameter of ball 52 is such that it is adapted to fit snugly within the receiver 36, but at the same time is freely rollable therefrom. It will be noted that the spacing between cage 42 and receiver 36 is such that when ball 50 is blocking the aperture 46, ball 52 is removed from the receiver 36 (Figs. 1 and 5) and on the other hand, when ball 52 is in the receiver, ball 50 no longer is blocking aperture 46 (Fig. 2).

In operation and use, the balls 50 and 52 are first inserted into the shell 16 and then cage 42 is pressed thereon until the desired positioning thereof has been achieved. The entire unit is then pressed into the neck 12 of bottle 10, the cage 42 assuming the innermost position. It will be understood that the entire insert is a tight press fit within the neck of the bottle, particularly base 44, and that once mounted therein, it is virtually impossible to remove it therefrom without breaking the bottle. When the bottle is upright as in Fig. 1, the relatively heavy ball 52 will gravitate downwardly against ball 50, forcing the latter inwardly against base 44 and providing therewith a tight seal. In this position it will be obvious that nothing can be poured into the bottle 10. Upon tilting the bottle below horizontal, however (Fig. 2), ball 52 rolls up inclines 38 into the receiver 36, whereupon the ball 50 is free to roll downwardly, thus unblocking the aperture 46 and allowing liquid or the like to pour freely out. Spout 27 will serve to better direct the flow of outgoing liquid. As soon as the bottle approaches the horizontal, however, Fig. 5, ball 52 will start to roll down inclines 38 thereby once again forcing the ball 50 into its closed position.

As aforementioned, baffles 20 and 22 will serve to block penetration of my insert by an elongated wire or rod, thus preventing surreptitious manipulation of the balls in an effort to maintain the valve open while the bottle is upright. Furthermore, should an attempt be made to refill the bottle while it is tilted downwardly by creating a vacuum therein, the light-weight hollow plastic ball 50 would be sucked upwardly to closed position, or else the liquid flow itself would carry it up to said closed position.

While the spacing of cage 42 with respect to receiver 36 is critical in that it must be close enough thereto so that ball 52 will thrust ball 50 inwardly against base 44, it will be understood that a certain amount of play is still possible. Thus, by varying the longitudinal position of cage 42 with respect to shell 16 within these prescribed limits, the extent of movement of ball 50 away from base 44 can be controlled. This in turn affords a control over the rate of flow of liquid from within the bottle.

One of the principal difficulties heretofore encountered in non-refillable inserts resulted from the fact that when pouring liquid out of the bottle through what was necessarily a relatively constricted passageway, the in-rushing air created a block whereupon the liquid would come out at an extremely slow rate. Accordingly, an important feature of my invention is the elimination of this difficulty, which I have accomplished by providing a separate and distinct passage for the incoming air. Reference is made to the area outside the shell between the ribs 18, this area being adapted for the reception of incoming air. Thus by segregating the incoming air from the outgoing liquid, a much improved pouring action is achieved. The circular flange 19 will prevent introduction of a probing element along the outside of the shell, which is necessary and important since otherwise a wire could be forced downwardly along the outside of shell 16, eventually forcing its way inwardly through cage 42 to surreptitiously retain ball 50 out of its closed position. The extended lengths of ribs 18 are important, since they insure the presence of air inlet and outlet openings. In other words, the opening between flange 19 and shell 16 allows the air to flow through to the outside of said shell, while at the other end of the shell, there will also be an opening which will allow the air to continue through into the bottle since even if the cage 42 is thrust in as far as it can go, it will simply butt up against the ends of ribs 18, and hence the circulation of the air will not be shut off.

From the foregoing it will be apparent that there is provided in accordance with this invention an insert for making a bottle or the like non-refillable which although simple in principle, is highly effective in operation. Furthermore, since in production it could be made cheaply, it would be disposed of along with the empty receptacle with which it was associated. The uses for such a device are numerous. For example, it would be of great value in connection with medicinal bottles, since it would positively prevent confusion of labels which sometimes occurs when medicine bottle are refilled. It would further be of value in connection with the sale of alcoholic beverage, since it would eliminate the subterfuge of selling less expensive liquors in bottles normally associated with higher priced liquors.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claim:

I claim:

An insert for making a receptacle non-refillable, comprising a cylindrical shell, the outer surface of which has a plurality of spaced projections, whereby when said shell is inserted within the neck of a receptacle it will be in spaced relation thereto, said projections comprising longitudinal ribs of slightly greater length than said shell, a cage element carried by said shell at one extremity thereof and having a circular base disposed adjacent the ends of said ribs, said base being of larger diameter than said shell and having an aperture therein, a plurality of spaced longitudinally extending legs extending from said base and in abutting relation with the inner surface of said shell, movable means carried within said cage element and adapted to block said aperture to prevent fluid flow therethrough, said means being movable from a blocking to an unblocking position, and actuating means carried by said shell for automatically causing said movable means to move to blocking position when the shell is horizontally or upwardly disposed.

References Cited in the file of this patent

UNITED STATES PATENTS

| | | |
|---|---|---|
| 577,426 | Franken | Feb. 23, 1897 |
| 600,492 | Gerlach | Mar. 8, 1898 |
| 958,588 | Burleigh | May 17, 1910 |
| 1,086,324 | Hammond | Feb. 3, 1914 |
| 1,177,399 | Dorn | Mar. 28, 1916 |
| 2,296,577 | Schillinger | Sept. 22, 1942 |

FOREIGN PATENTS

| | | |
|---|---|---|
| 200,443 | Great Britain | July 12, 1923 |
| 803,368 | France | July 6, 1936 |